United States Patent [19]

Mizuno et al.

[11] 4,150,359
[45] Apr. 17, 1979

[54] METHOD AND APPARATUS FOR CONTROLLING VEHICLE DIRECTIONAL LAMPS

[75] Inventors: Tiaki Mizuno, Toyota; Yoshichi Kawashima, Gifu, both of Japan

[73] Assignee: Nippondenso Co., Ltd., Kariya, Japan

[21] Appl. No.: 872,588

[22] Filed: Jan. 25, 1978

[30] Foreign Application Priority Data

| Mar. 9, 1977 | [JP] | Japan | 52-25611 |
| Jul. 13, 1977 | [JP] | Japan | 52-84358 |

[51] Int. Cl.² .................. B60Q 1/38; G08B 5/38; G08B 21/00
[52] U.S. Cl. .................. 340/81 R; 340/642; 340/331; 340/73; 315/200 A
[58] Field of Search ............ 340/81 R, 81 F, 73, 340/72, 71, 67, 642; 307/10 LS; 315/77, 200 A; 331/109

[56] References Cited

U.S. PATENT DOCUMENTS

| 3,421,157 | 1/1969 | Atkins | 340/642 |
| 3,562,668 | 2/1971 | Bartlett et al. | 331/109 |
| 3,623,154 | 11/1971 | Yonezu | 340/81 F |
| 3,811,107 | 5/1974 | Sakurai | 340/81 F |
| 3,858,088 | 12/1974 | Scarpino et al. | 315/200 A |
| 3,858,178 | 12/1974 | Harrison | 340/81 F |

*Primary Examiner*—Donald J. Yusko
*Attorney, Agent, or Firm*—Cushman, Darby & Cushman

[57] ABSTRACT

An improved method and apparatus for use in the direction indicating system of a vehicle having a group of front, rear and side directional lamps. The directional lamps are connected in parallel with each other to be energized by a battery through a current detecting resistor, a normally-closed relay and a selection switch. The relay is energized to open periodically in response to a train of pulses so that the directional lamps flash periodically during closure of the selection switch. Closure of the selection switch is detected in response to the voltage across the current detecting resistor to generate the pulses applied to the relay.

5 Claims, 8 Drawing Figures

METHOD AND APPARATUS FOR CONTROLLING VEHICLE DIRECTIONAL LAMPS

BACKGROUND OF THE INVENTION

The present invention relates to a method and apparatus for controlling periodic flashing of vehicle directional lamps and particularly to an improvement in the generation of pulses which control the periodic flashing of the directional lamps.

It is known well in the direction indicating system of an automotive vehicle that a group of front, rear and side directional lamps are energized in response to a train of periodic pulses to flash periodically upon requirement for the indication of vehicle turning direction. It is also known that the frequency of the periodic pulses is increased upon disconnection of the front or rear directional lamp to increase flashing frequency of the remaining directional lamps.

One of this system is disclosed in the prior art, U.S. Pat. No. 3,858,177 issued on Dec. 31, 1974, in which front and rear directional lamps are connected in parallel with each other and connected in series with a battery, a current detecting resistor, a relay and a selection switch and an electronic circuit is provided to generate a train of periodic pulses applied to the relay. The electronic circuit is connected to the selection switch so that the periodic pulses are generated only during closure of the selection switch.

According to this kind of electric connection between the electronic circuit and the selection switch, the electronic circuit is likely to erroneously generate the pulses. This erroneous operation of the electronic circuit results from noise signal which are induced on long electric wirings between the selection switch and the directional lamps in a vehicle wiring connection. It should be noticed further that the electronic circuit, when integrated into a single semiconductor chip, is broken down by the noise signals.

SUMMARY OF THE INVENTION

It is therefore a primary object of the present invention to provide an improved method and apparatus in which erroneous flashing of directional lamps resulting from noise signals is prevented.

It is a further object of the present invention to provide an improved method and apparatus in which flashing condition of directional lamps are detected in response to the electric current flowing from a battery to the directional lamps.

It is a still further object of the present invention to provide an improved method and apparatus in which flashing frequency of directional lamps is increased upon failure in the directional lamps.

DETAILED DESCRIPTION OF THE PREFERRED EMBODIMENTS

Figure 1:
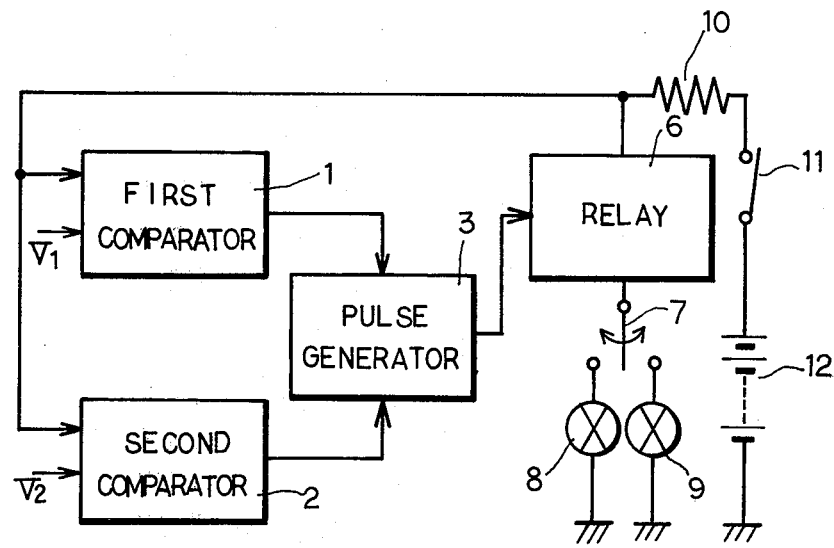
FIG. 1 is a schematic block diagram illustrating a first embodiment according to the invention.

Referring first to FIG. 1, two directional lamp groups 8 and 9 are shown in series connection with a manually-operated selection switch 7, a relay 6, a current detecting resistor 10, a battery switch 11 and a storage battery 12. The directional lamp groups 8 and 9 are mounted on respective left and right portions of an automotive vehicle, for example. As is known well, either one of directional lamp groups 8 and 9 is energized upon closure of the selection switch 7 by the battery 12 through the battery switch 11, the resistor 10 and the relay 6. The relay 6 is energized periodically during closure of the selection switch 7 to cause the lamp group 8 or 9 to flash periodically for indicating the turning direction of the vehicle.

Provided to control the energization of the relay 6 is an electronic circuit comprising a first comparator 1, a second comparator 2 and a pulse generator 3. The first and second comparators 1 and 2 are connected to the resistor 10 for respectively detecting lamp failure (disconnection in the lamp groups) and closure of the selection switch 7 in response to the signal developed by the resistor 10. First and second reference signals $V_1$ and $V_2$ are applied to the first and second comparators 1 and 2, respectively, so that the signal applied from the resistor 10 is compared therewith. The pulse generator 3 is connected to the first and second comparators 1 and 2 to control alternate conduction and nonconduction of the relay 6. The pulse generator 3 generates a train of periodic pulses applied to the relay 6 in response to the output signal produced by the second comparator 2 and indicative of closure of the selection switch 7, whereas it changes the frequency and duty cycle of the periodic pulses in response to the output signal produced by the first comparator 1 and indicative of the disconnection in the lamp groups 8 or 9.

Figure 3:
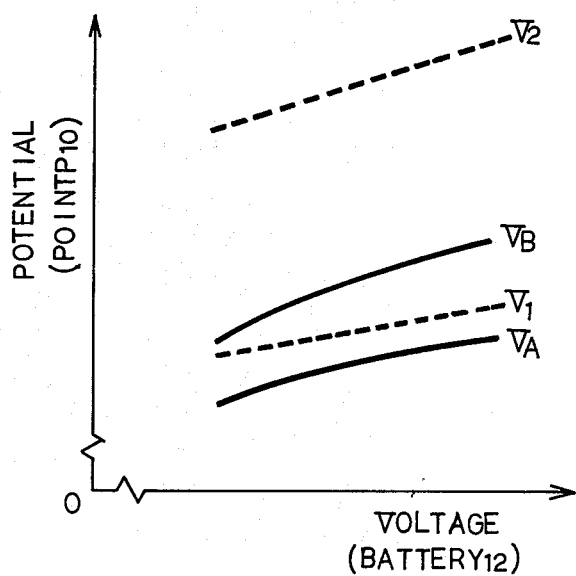
FIG. 3 is a characteristic chart illustrating relations between the voltages across a battery and a current detecting resistor shown in FIG. 2.
Figure 2:
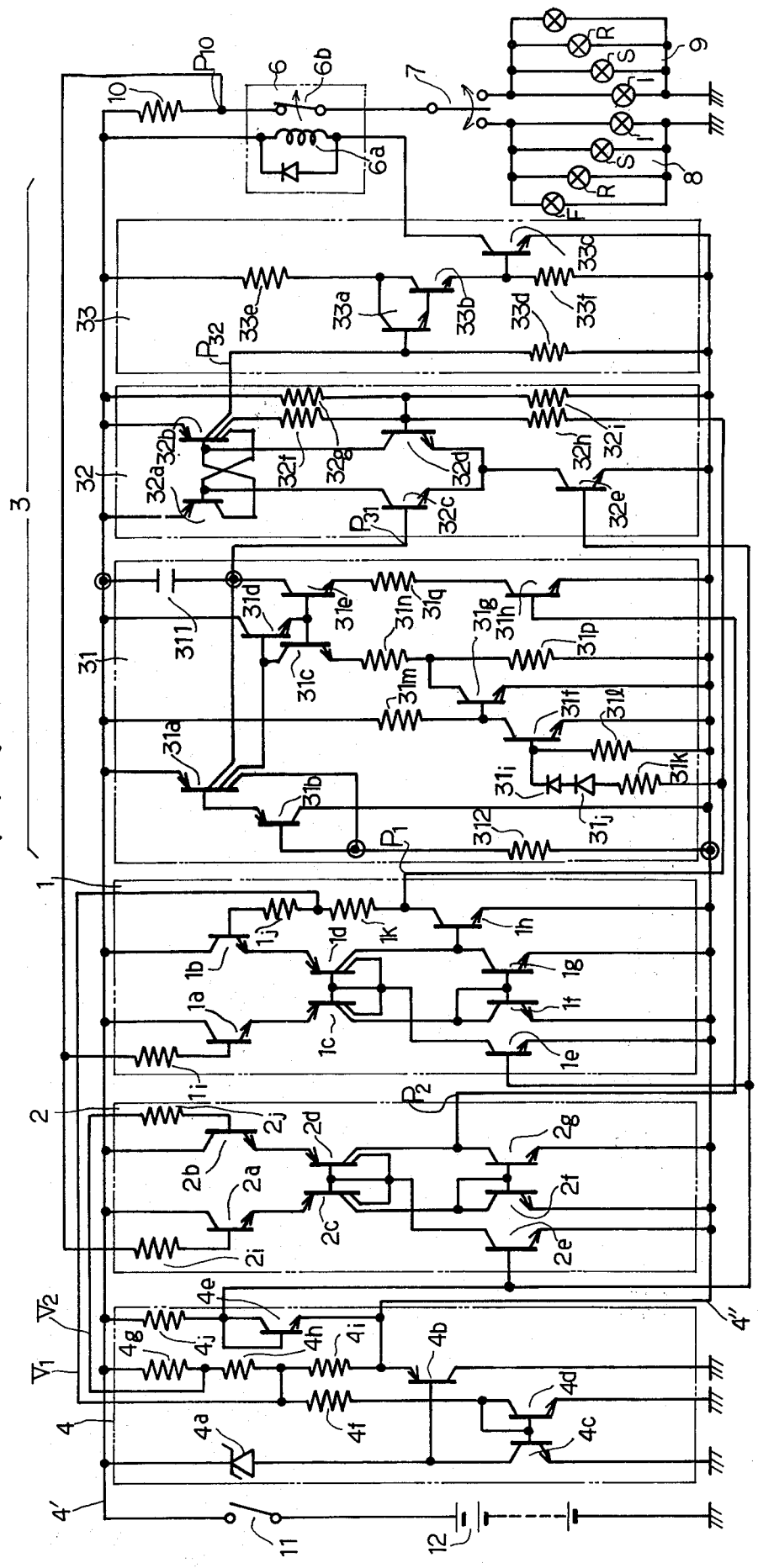
FIG. 2 is an electric wiring diagram illustrating the detail circuit construction of the embodiment shown in FIG. 1.

Referring next to FIG. 2, it should be noticed that the relay 6 is normally-closed type, or normally-conductive type, so that the resistor 10 and the selection switch 7 is normally connected. It should be noticed further that each of the lamp groups 8 and 9 comprises a front, rear, side and inner directional lamps which are connected in parallel with each other and denoted by respective alphabetical letters F, R, S and I. The directional lamps F, R and S are mounted on respective front, rear and side outside portions of the vehicle, whereas the directional lamp I is mounted on an inside portion of the vehicle. The front and rear lamps F and R consume more electric energy than the side lamp S which consumes more electric energy than the inner lamp I. Since the voltage across the resistor 10 is proportional to the total current flowing from the battery 12 into the lamps F, R, S and I, the voltage across the resistor 10 becomes smaller when the lamp F or R is disconnected than when none of the lamps F, R, S and I are disconnected. The voltage across the resistor 10 is dependent on the voltage across the battery 12 as well as on lamp failures. Voltage changes across the resistor 10 are shown in FIG. 3 in terms of potential changes at a junction point $P_{10}$ where the relay 6 and the resistor 10 is connected. Characteristic curves $V_A$ and $V_B$ respectively represent the potentials produced relative to the ground potential upon no failure in the lamps and failure in the lamp F or R with the selection switch 7 being closed.

Referring further to FIG. 2, the electronic circuit designed to be integrated into a single semiconductor chip is described in detail hereinunder. A voltage regulator 4 is connected across the battery 12 to provide the first and second comparators 1 and 2 and the pulse generator 3 with a regulated constant voltage. The voltage regulator 4 comprises a Zener diode 4a, transistors 4b, 4c, 4d and 4e, and resistors 4f, 4g, 4h, 4i and 4j. The Zener diode 4a having a constant breakdown voltage is connected in series with the emitter-collector path of the transistor 4c between the ground and a positive bus 4' connected to the positive terminal of the battery 12. The emitter-collector path of the transistor 4b is connected in series with the resistors 4g, 4h and 4i between the positive bus 4' and the ground. The base of the transistor 4b is connected to the anode of the diode 4a so that a negative bus 4" connected to the emitter of the transistor 4b provides a potential which changes in proportion to a potential on the positive bus 4'. Therefore the voltage between the positive and negative buses 4' and 4" is regulated to be constant. The series connection of the resistors 4g, 4h and 4i provides the first and second reference signals $V_1$ and $V_2$ at respective junctions between the resistors 4h and 4i and between the resistors 4g and 4h. The potential of the first reference signal $V_1$ is determined, as shown in FIG. 3, to be higher and lower than the potentials represented by $V_A$ and $V_B$, respectively. The potential of the second reference signal $V_2$ is determined, as shown in FIG. 3, to be much higher than the potential represented by $V_B$. The potentials of the first and second reference signals $V_1$ and $V_2$ are referred to as first and second reference potentials $V_1$ and $V_2$ hereinunder, respectively.

The first comparator 1 comprises transistors 1a, 1b, 1c, 1d, 1e, 1f, 1g and 1h, and resistors 1i, 1j and 1k. The emitter-collector paths of the transistors 1a, 1c and 1f are connected in series between the positive and negative buses 4' and 4", whereas the emitter-collector paths of the transistors 1b, 1d and 1g are connected in series between the positive and negative buses 4' and 4". The bases of the transistors 1c and 1d are connected to each other, and the bases of the transistors 1f and 1g are connected to each other. The base of the transistor 1a is connected to receive the potential produced at the point $P_{10}$ through the resistor 1i, whereas the base of the transistor 1b is connected to receive the first reference potential $V_1$ produced by the voltage regulator 4 through the resistor 1j. The base of the transistor 1h is connected to the collectors of the transistors 1d and 1g.

According to this construction, while the first reference potential $V_1$ applied to the transistor 1b is higher than the potential applied to the transistor 1a, the transistors 1a, 1b, 1c, 1d, 1f, 1g and 1h are rendered OFF, ON, OFF, ON, OFF, OFF and ON, respectively. While the first reference potential $V_1$ is lower than the potential applied to the transistor 1a, the transistors 1a, 1b, 1c, 1d, 1f, 1g and 1h are rendered ON, OFF, ON, OFF, ON, ON and OFF, respectively. ON and OFF of the transistor 1h result in producing respective low and high output potentials at an output point $P_1$.

The second comparator 2 comprises transistors 2a, 2b, 2c, 2d, 2e, 2f and 2g, and resistors 2i and 2j. The emitter-collector paths of transistors 2a, 2c and 2f are connected in series between the positive and negative buses 4' and 4", whereas the emitter-collector paths of the transistors 2b, 2d and 2g are connected in series between the positive and negative buses 4' and 4". The bases of the transistors 2c and 2d are connected to each other, and the bases of the transistors 2f and 2g are connected to each other. The base of the transistor 2a is connected to receive the potential produced at the point $P_{10}$ through the resistor 2i, whereas the base of the transistor 2b is connected to receive the second reference potential $V_2$ produced by the voltage regulator 4.

According to this construction, while the second reference potential $V_2$ applied to the transistor 2b is lower than the potential applied to the transistor 2a, the transistors 2a, 2b, 2c, 2d, 2f and 2g are rendered ON, OFF ON, OFF, ON and ON, respectively. While the second reference potential $V_2$ is higher than the potential applied to the transistor 2a, the transistors 2a, 2b, 2c, 2d, 2f and 2g are rendered OFF, ON, OFF, ON, OFF and OFF, respectively. ON and OFF of the transistor 2g result in producing respective low and high output potentials at an output point $P_2$.

The pulse generator 3 is divided into three circuit stages from functional standpoint. These circuit stages are denoted as a periodic signal circuit 31, a comparison circuit 32 and a power circuit 33.

The periodic signal circuit 31 constitutes a triangular signal circuit in combination with a capacitor 311 and a resistor 312 which are not integrated into a semiconductor chip. The periodic signal circuit 31 comprises transistors 31a, 31b, 31c, 31d, 31e, 31f, 31g and 31h, diodes 31i and 31j, and resistors 31k, 31l, 31m, 31n, 31p, 31q. One of multiple collectors of the transistor 31a is connected to the resistor 312 connected to the negative bus 4" and another one of multiple collectors is connected to the capacitor 31l connected to the positive bus 4'. The transistors 31e and 31h and the resistor 31q are connected in series with the capacitor 31l to constitute a first current path which is also in series with the transistor 31a. The transistor 31h is connected to receive the output potential of the second comparator 2. The transistor 31c and the resistors 31n and 31p are connected in series with the transistor 31a to constitute a second current path. The emitter-collector path of the transistor 31g is connected in parallel with the resistor 31p to short-circuit the resistor 31p in response to the output signal applied from the first comparator 1 through the transistor 31f.

According to this construction, while the transistor 31h is rendered ON, a constant current supplied by the transistor 31a flows through the first current path to charge the capacitor 31l. While the capacitor 31l is charged by the constant current, the potential produced at an output point $P_{31}$ gradually decreases at a constant speed as shown by waveforms A and B in FIG. 4. On the contrary, while the transistor 31h is rendered OFF, the constant current does not flow through the first current path so that the capacitor 31l is discharged by another constant current which is supplied by the transistor 31a to flow the second current path. The potential at the point $P_{31}$ resultantly increases at another constant speed as shown by the waveforms A and B in FIG. 4.

Figure 4:
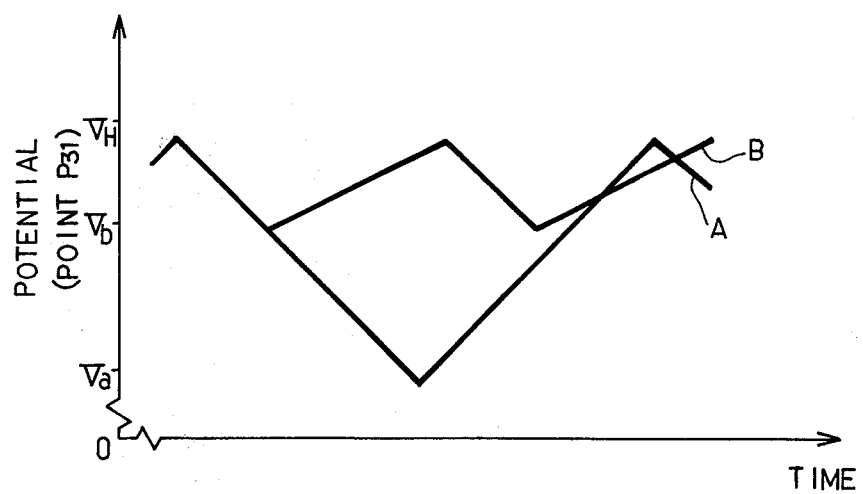
FIG. 4 is a waveform chart illustrating triangular signals developed within a pulse generator shown in FIG. 2.

The constant current flowing through the second current path is decreased in response to the nonconduction of the transistor 31g and the increasing speed of the potential at the point $P_{31}$ is decreased as shown by the waveform B in FIG. 4. Provided that the transistor 31h is rendered ON and OFF alternately, the periodic signal circuit 31 produces a train of triangular signals shown in FIG. 4. The frequency of the triangular signals is controlled by the comparison circuit 32.

The comparison circuit 32 comprises transistors 32a, 32b, 32c, 32d and 32e, and resistors 32f, 32g, 32h and 32i. The resistors 32f and 32h are connected in series between one of multiple collectors of the transistor 32b and the output terminal of the first comparator 1, and the resistors 32g and 32i are connected in series between the positive and negative buses 4' and 4". The junction between the resistors 32f and 32h and the junction between the resistors 32g and 32i are connected to produce a reference potential which is dependent on the output signal of the first comparator 1. The transistor 32c is connected to receive the triangular output signal of the periodic signal circuit 31, whereas the transistor 32d is connected to receive the reference potential.

According to this construction, while the base potential of the transistor 32c is higher than that of the transistor 32d, the transistors 32a, 32b, 32c and 32d are rendered ON, OFF, ON and OFF, respectively. While the base potential of the transistor 32c is lower than that of the transistor 32d, the transistors 32a, 32b, 32c and 32d are rendered OFF, ON, OFF and ON, respectively. ON and OFF of the multi-collector transistor 32b results in producing respective high and low output potentials at an output terminal $P_{32}$.

The power circuit 33 comprises transistors 33a, 33b and 33c, and resistors 33e and 33f. The transistors 33a and 33b are connected in Darlington configuration. The base of the transistor 33a is connected to receive the output potential of the comparison circuit 32, and the base of the transistor 33c is connected to the emitter of the transistor 33b. The emitter-collector path of the transistor 33c is connected in series with the coil 6a of the relay 6 having a normally-closed contact 6b.

According to this construction, while the base potential of the transistor 33a is low, all the transistors 33a, 33b and 33c are rendered OFF to deenergize the coil 6a of the relay. While the base potential of the transistor 33a is high, all the transistors 33a, 33b and 33c are rendered ON to energize the coil 6a.

Next, the overall operation of the first embodiment is described with an assumption that the battery switch 11 is closed to cause the voltage regulator 4 provides the constant voltage between the buses 4' and 4" and first and second reference potentials $V_1$ and $V_2$.

With the selection switch 7 being opened to contact none of lamp groups 8 and 9, electric current does not flow through the resistor 10 and the potential at the point $P_{10}$ is equal to the potential on the positive bus 4'. Since the potential on the positive bus 4' is higher than the first and second reference potentials $V_1$ and $V_2$, the first and second comparators 1 and 2 produce high and low potentials at the points $P_1$ and $P_2$, respectively. The transistor 31h in the periodic signal circuit 31, receiving the low potential from the second comparator 2, is rendered OFF to prevent the capacitor 31l from being charged. The output potential of the periodic signal circuit 31 is thus kept high, and resultantly the comparison circuit 32 produces low potential at the point $P_{32}$ with the transistor 32b being rendered OFF. Therefore the power circuit 33 keeps deenergizing the relay coil 6a. In such a manner as described, the periodic pulse generator 3 is prevented from generating periodic pulses and the relay 6 is not energized, as long as the selection switch 7 is kept opened.

As soon as the selection switch 7 is closed, either one of lamp groups 8 and 9 starts to flash with the electric current flowing from the battery 12 through the resistor 10 and the closed contact 6b of the relay 6. The potential at the point $P_{10}$, on this occasion, becomes lower than the first and second reference potentials $V_1$ and $V_2$ as shown by $V_A$ in FIG. 3, when none of the lamps F, R, S and I is disconnected. On the contrary the potential at the point $P_{10}$ becomes higher than the first reference potential $V_1$ but lower than the second reference potential $V_2$ as shown by $V_B$ in FIG. 3, when at least one of front and rear lamps F and R is disconnected.

Provided that none of the lamps F, R, S and I is disconnected, the first and second comparators 1 and 2 produce low and high output potentials at the points $P_1$ and $P_2$, respectively, with the potential $V_A$ being lower than the first and second reference potentials $V_1$ and $V_2$. In the periodic signal circuit 31, the transistor 31h is rendered ON to charge the capacitor 31l in response to the high output potential applied from the second comparator 2. The potential at the point $P_{31}$ resultantly decreases at the constant speed shown by the waveform A in FIG. 4. The comparison circuit 32, establishing the low reference potential $V_a$ shown in FIG. 4 in response to the low output potential applied from the first comparator 1, keeps producing the low output potential at the point $P_{32}$. When the capacitor 31l is charged enough so that the potential at the point $P_{31}$ becomes equal to the reference potential $V_a$, ON-OFF conditions of the transistors 32a through 32d in the comparison circuit 32 are reversed and high output potential is produced at the point $P_{32}$. The power circuit 33, receiving the high output potential from the comparison circuit 32, energizes the coil 6a of the relay 6 which responsively opens the contact 6b. The relay 6 prevents the lamps F, R, S and I from flashing. With the relay contact 6b being opened, the potential at the point $P_{10}$ is increased to the potential equal to the potential on the positive bus 4' so that the first comparator 1 produces low output potential due to the feedback resistor 1k and the second comparator produces low output potential. As a result, the transistor 31h is rendered OFF to discharge the capacitor 31l and the transistors 31f and 31g are rendered OFF and ON to determine the increasing speed of the potential at the point $P_{31}$. During the discharge of the capacitor 31l, the comparison circuit 32 keeps producing high output potential and the power circuit 33 keeps energizing the relay 6. When the potential at the point $P_{31}$ becomes equal to the high reference potential $V_H$ established by the conduction of the transistor 32b in the comparison circuit 32, the comparison circuit 32 reverses the output potential from high to low potential and the power circuit 33 deenergize the relay coil 6a so that the contact 6b is closed again. With the relay 6 being deenergized, the lamps F, R, S and I flash again. In such a manner as described, as long as the selection switch 7 is closed, the periodic signal circuit 31 keeps producing a train of triangular signals shown by A in FIG. 4 and the comparison circuit 32 keeps producing a train of periodic pulses.

Provided that at least one of front and rear lamps F and R is disconnected, both the first and second comparators 1 and 2 produce high output potentials at the points $P_1$ and $P_2$, respectively, with the potential $V_B$ being higher than the first reference potential $V_1$ and lower than the second reference potential $V_2$. Since the output potential of the second comparator 2 which detects closing conditions of the relay contact 6b and the selection switch 7 changes in the quite same manner as described with reference to a case in which none of the lamps F, R, S and I are disconnected, the periodic pulse generator 3 operates to generate a train of periodic pulses in the same manner as described so that periodic flashing is attained. The periodic pulse generator 3, however, increases the frequency and decreases the duty cycle of the periodic lamp flashing so that the lamp failure in the lamp group is observed with ease by the change in periodic flashing. The frequency of lamp flashing is increased by the comparison circuit 32 which establishes the low reference potential $V_b$ in response to the high output potential of the first comparator 1 which detects lamp failure. The reference potential $V_b$ is kept higher than the reference potential $V_a$ as shown in FIG. 4. The duty cycle of lamp flashing is decreased by the transistors 31f and 31g in the periodic signal circuit 31. The transistors 31f and 31g are rendered ON and OFF, respectively, in response to the high output potential of the first comparator 1. The increasing speed of the potential at the point $P_{31}$ is decreased to be smaller than the decreasing speed thereof as shown by the waveform B in FIG. 4.

As described hereinabove, pulse generating operation of the pulse generator 3 is controlled by the second comparator 2 which detects closing conditions of the relay 6 and the selection switch 7 in response to the potential developed at the junction point $P_{10}$. Since the input impedances of the first and second comparators 1 and 2 are enabled to be low enough by the resistor 10 having low resistance value (some 50 milliohms), potential changes produced at the point $P_{10}$ by the noise signals are decreased to a considerable extent. Therefore, proper operation of the pulse generator 3 is ensured.

Figure 5:
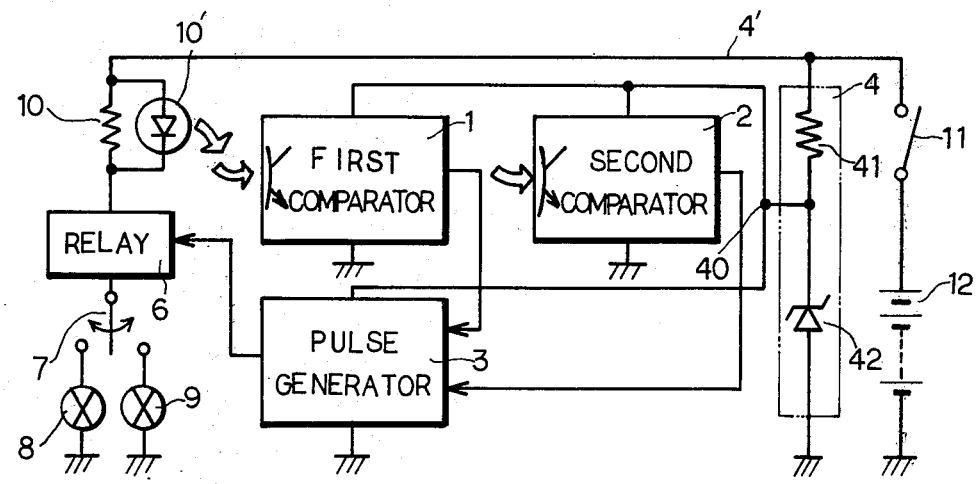
FIG. 5 is a schematic block diagram illustrating a modification of the first embodiment shown in FIG. 1.
Figure 6:
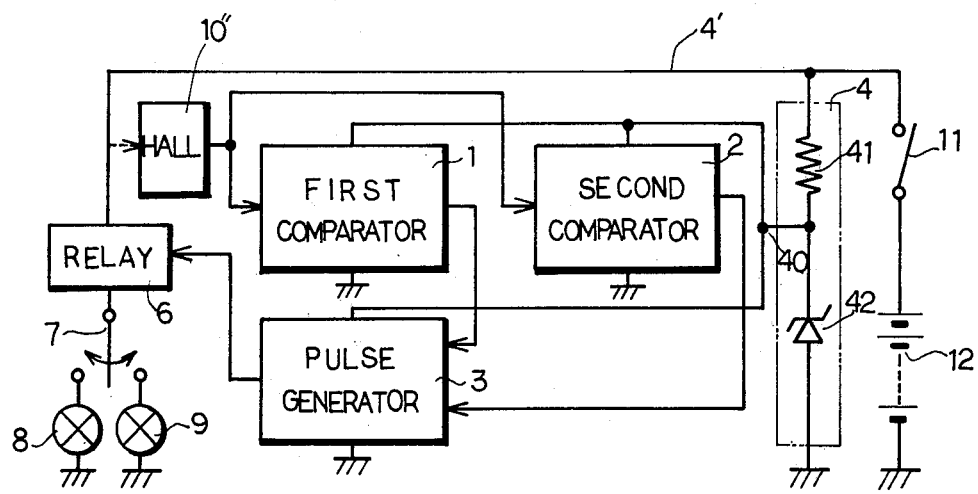
FIG. 6 is a schematic block diagram illustrating another modification of the first embodiment shown in FIG. 1.
Figure 7:
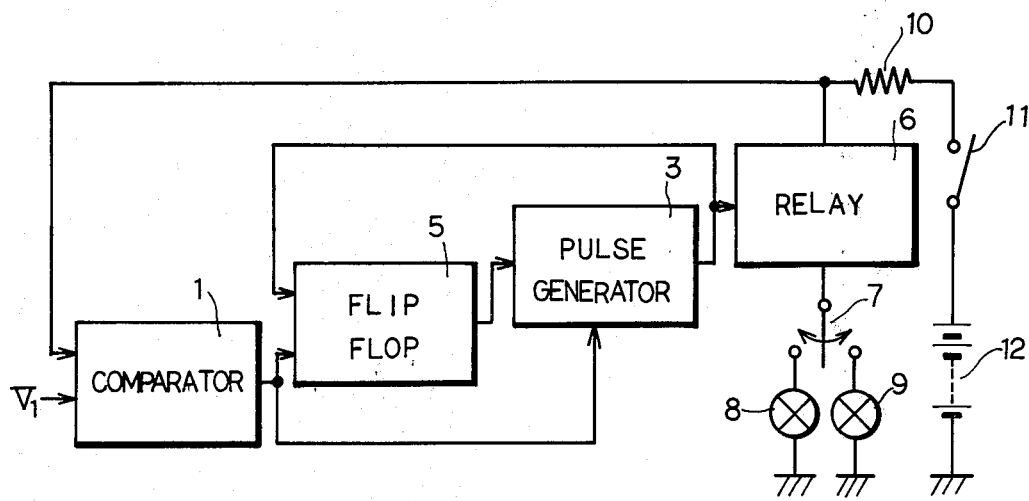
FIG. 7 is a schematic block diagram illustrating a second embodiment according to the invention.

The first embodiment shown in FIGS. 1 and 2 may be modified as shown in FIGS. 5 and 6 in which like reference numerals are used to designate identical or equivalent components shown in FIG. 1. In these modifications, the voltage regulator 4 comprises a resistor 41 and a Zener diode 42 connected in series to keep the potential on another positive bus 40 at a constant level relative to the grounded potential so that the first and second comparators 1 and 2 and the pulse generator 3 which are integrated into a semiconductor chip are provided with a regulated voltage. In FIG. 5, a photo diode 10' is connected in parallel with the resistor 10 to produce the light corresponding to the voltage developed across the resistor 10 and photo transistors are provided at respective input stages of the first and second comparators 1 and 2 to detect disconnections in the lamp groups 8 and 9 and closing conditions of the relay 6 and the selection switch 7 in response to the light. In FIG. 6, a HALL element 10" is operatively coupled to the positive bus 4' (power supply bus) to produce an output signal corresponding to the current flowing from the battery 12 to the lamp group 8 or 9. It should be understood in both modifications that, since the current flowing through the positive bus 4' is indirectly detected and the first and second comparators 1 and 2 are supplied with the constant voltage through the positive bus 40, correct operation of the pulse generator 3 is ensured against the noise signals induced on the positive bus 4'.

The second embodiment of the present invention is described with reference to FIGS. 8 and 9 in which like reference numerals are used to designate identical or equivalent components shown in FIG. 1. The second embodiment is different from the first embodiment in that a flip-flop 5 is connected to the pulse generator 3 for controlling pulse generating operation of the pulse generator 3. For this purpose, the flip-flop 5 detects closing conditions of the relay 6 and the selection switch 7 in response to the output signals of the comparator 1 and the pulse generator 3.

Figure 8:
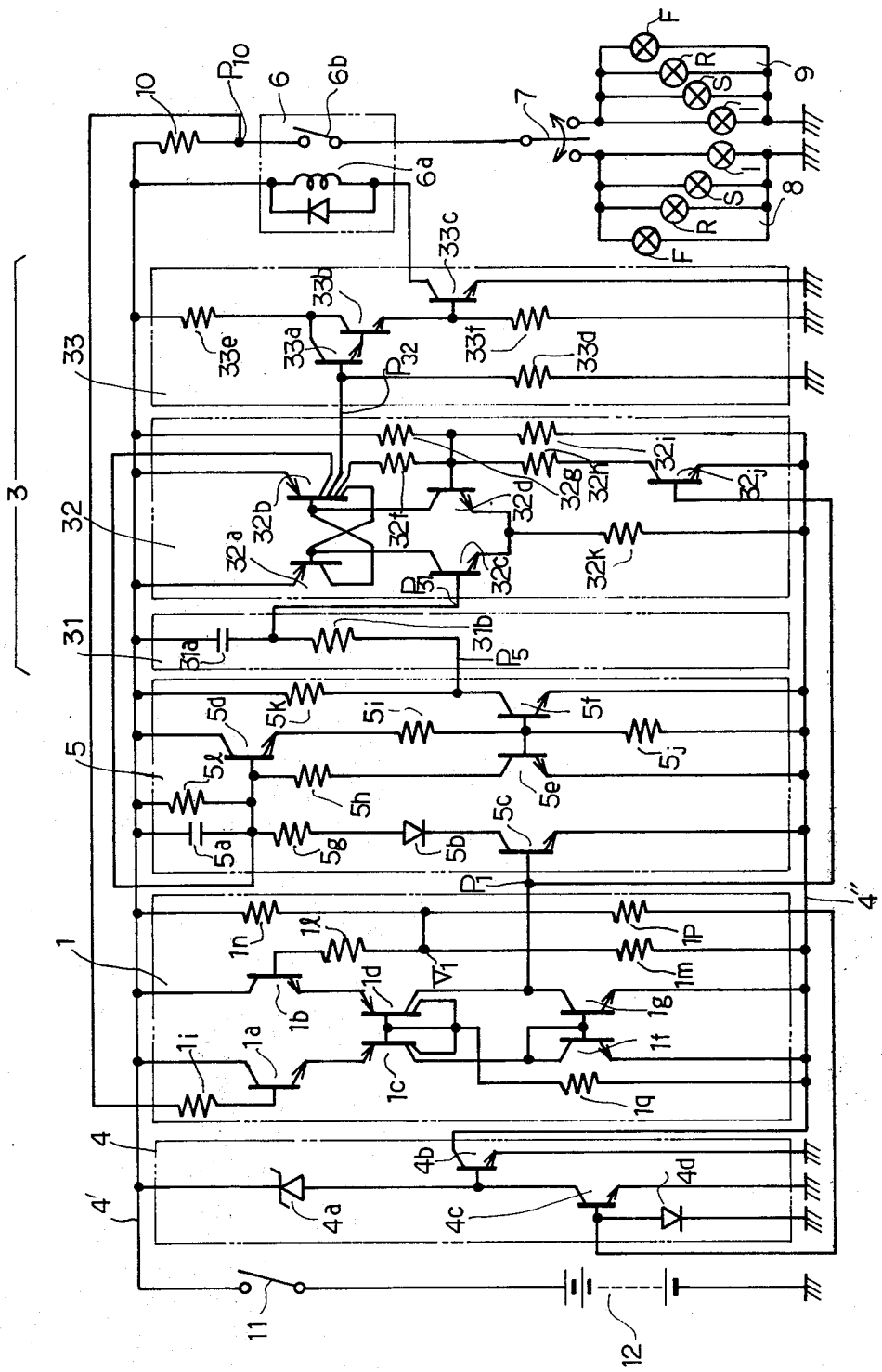
FIG. 8 is an electric wiring diagram illustrating the detail circuit construction of the embodiment shown in FIG. 7.

The flip-flop 5 comprises, as shown in FIG. 8, a capacitor 5a, a diode 5b, transistors 5c, 5d, 5e and 5f, and resistors 5g, 5h, 5i, 5j, 5k and 5l. It should be noticed in FIG. 8 that resistors 1l, 1m, 1n and 1p are provided in the comparator 1 for providing the transistor 1b with the reference potential $V_1$ shown in FIG. 3, and that the periodic signal circuit 31 in the pulse generator 3 comprises only a capacitor 31a and a resistor 31b.

According to the construction shown in FIG. 8, the overall operation of the second embodiment is described in the same manner as in the first embodiment.

With the selection switch 7 being opened, the potential at the point $P_{10}$ is kept equal to the potential on the positive bus 4'. As a result, the comparator 1 produces a low output potential at the output point $P_1$ thereof with the transistors 1a, 1b, 1c, 1d, 1f and 1g being rendered ON, OFF, ON, OFF, ON and ON, respectively, and the flip-flop 5 produces a high output potential at an output point $P_5$ thereof with all the transistors 5c, 5d, 5e and 5f being rendered OFF. Therefore, periodic signal circuit 31 connected in series with the transistor 5f of the flip-flop 5 produces a high potential at the output point $P_{31}$ with the capacitor 31a being not charged at all so that the comparison circuit 32 produces a low potential at the point $P_{32}$ with the transistors 3a, 3b, 3c and 3d being rendered ON, OFF, ON and OFF, respectively. Receiving the low output potential from the comparison circuit 32, the power circuit 33 keeps deenergizing the relay 6. In such a manner as described, the flip-flop 5 prevents the pulse generator 3 from generating periodic pulses so long as the selection switch 7 is kept open.

As soon as the selection switch 7 is closed to cause the lamp group 8 or 9 to flash, the potential at the point $P_{10}$ becomes low due to the current which flows through the relay 6 and the selection switch 7.

Provided that none of the lamps F, R, S and I are disconnected, the potential $V_A$ at the point $P_{10}$ becomes lower than the reference potential $V_1$ as shown in FIG. 3. The comparator 1 produces a high output potential with the transistors 1a, 1c, 1f and 1g being rendered OFF, and the flip-flop 5 produces a low output potential with all the transistors 5c, 5d, 5e and 5f being rendered ON so that the capacitor 31a in the periodic signal circuit 31 is charged to produce decreasing potential at the output $P_{31}$. Since no constant current sources are provided in the periodic signal circuit 31, the decreasing speed of the output potential at the point $P_{31}$ gradually decreases with respect to time. The potential at the point $P_{31}$, in other words, changes exponentially with the time constant determined by the capacitor 31a and the resistor 31b. The capacitor 31a is kept charged until the potential at the point $P_{31}$ becomes equal to the lower reference potential $V_a$ shown in FIG. 4. The reference potential $V_a$ is determined by the resistors 32g, 32h and 32i in response to the conduction of the transistor 32j in the comparison circuit 32. When the output potential at the point P$_{31}$ is decreased to be equal to the reference potential V$_a$, the comparison circuit 32 produces a high output potential with the transistors 32b and 32d being rendered ON so that the relay 6 is energized by the power circuit 33 to open the contact 6b. The lamps F, R, S and I, having started to flash upon closure of the selection switch 7, stop flashing upon opening of the relay contact 6b. Due to opening of the relay contact 6b, the potential at the point P$_{10}$ becomes equal to the potential on the positive bus 4' again and the comparator 1 and the flip-flop 5 responsively produce respective low and high output potentials to prevent the capacitor 31a from being charged. The capacitor 31a is therefore discharged so that the potential at the point P$_{31}$ exponentially increases with respect to time. Since the transistor 32j in the comparison circuit 32 is rendered OFF in response to the low output potential of the comparator 1, discharging of the capacitor 31a is kept until the potential at the point P$_{31}$ increases to be equal to the higher reference potential V$_H$ determined by the resistors 32f, 32g and 32i. When the output potential of the periodic signal circuit 31 becomes equal to the higher reference potential V$_H$ established in the comparison circuit 32, the transistors 32b and 32d which have been rendered ON during discharging of the capacitor 31a are rendered OFF to produce low output potential at the point P$_{32}$. The power circuit 33, having energized the relay 6, stops energization in response to the high output potential of the comparison circuit 32 so that the lamps F, R, S and I flash again. Since the abovedescribed operation is repeated with the selection switch 7 being closed, the lamps F, R, S and I are controlled to flash periodically.

Even while at least one of front and rear lamps F and R is disconnected, a large current transiently flows through the resistor 10 and the relay 6 at the beginning of closure of the selection switch 7 to provide at the point P$_{10}$ a potential lower than the reference potential V$_1$. As a result, the comparator 1, the flip-flop 5 and the pulse generator 3 start to operate in the same manner as described with regard to no lamp failure. After a short while, however, the potential V$_B$ at the point P$_{10}$ becomes higher than the reference potential V$_1$ so that the comparator 1 keeps producing low output potential at the output point P$_1$ thereof. The transistors 5c and 32j in respective flip-flop 5 and comparison circuit 32 are responsively kept OFF. Due to nonconduction of the transistor 5c, the transistors 5d, 5e and 5f in the flip-flop 5 are rendered ON and OFF alternately in response to the output potential of the comparison circuit 32 so that the pulse generator 3 produces a train of periodic pulses for controlling periodic flashing of the lamps. Due to the nonconduction of the transistor 32j, the lower reference potential established by the resistors 32g and 32i in the comparison circuit 32 is increased to V$_b$ which is higher than the lower reference potential V$_a$ as shown in FIG. 4. It should be noticed that, since the periodic signal circuit 31 produces a train of exponential output signals at the output point P$_{31}$ thereof, the frequency and duty cycle of the periodic pulses in increased and decreased, respectively, by the lower reference potential V$_b$. The periodic signal circuit 31 in the second embodiment may be constructed to produce a train of triangular signals in the same manner as in the first embodiment.

In the second embodiment, since the input impedance of the comparator 1 is enabled to be low enough by the resistor 10 and since the flip-flop 5 is connected to be responsive to the output potential of the pulse generator 3, proper operation of the pulse generator 3 is ensured.

What is claimed is:

1. In a turn direction indicating system of a vehicle in which either one of two lamp groups, each thereof having a front and rear directional lamps connected in parallel with each other, is energized to flash by an electric current flowing from a battery during closure of a selection switch connected in series with said battery, an apparatus comprising:

current detection means responsive to the electric current flowing from said battery to the lamp group selected by closure of said selection switch and effective to produce a detection output signal changing with changes in the electric current within two output levels, one and the other of said two output levels being corresponding to respective maximum and minimum values of the electric current;

reference means effective to produce a reference signal having a predetermined level intermediate said two output levels of said detection output signal;

comparison means responsive to said detection output signal and said reference signal and effective to produce a comparison output signal when the output level of said detection signal attains the predetermined level of said reference signal;

pulse generation means responsive to said comparison output signal and effective to start generating a train of periodic pulses at a constant frequency in response to said comparison output signal; and switch means connected in series between said battery and said selection switch and effective to be rendered conductive and nonconductive alternately in response to said periodic pulses for periodically energizing said lamp group, said switch means being normally-conductive type in construction so that said lamp group may be energized by the electric current at the same time with closure of said selection switch.

2. An apparatus as defined in claim 1, wherein said current detection means comprises a resistor connected in series with said selection switch and said switch means for producing, as said detection output signal, a voltage signal changing in proportion to the electric current flowing therethrough, and wherein said pulse generation means comprises a periodic signal circuit for producing a train of periodic signals increasing and decreasing alternately in response to said comparison output signal and a comparison circuit for comparing said periodic signals with a reference signal established therein to thereby convert said periodic signals into said periodic pulses.

3. An apparatus as defined in claim 2, wherein said periodic signal circuit comprises a capacitor, a first current path for charging said capacitor with a first constant current flowing therethrough, and a second current path for discharging said capacitor with a second constant current flowing therethrough, whereby said capacitor produces thereacross a train of triangular signals as said periodic signals.

4. In a turn direction indicating system of a vehicle in which at least front and rear directional indicators connected in parallel with each other are energized to flash by an electric current flowing from a battery during closure of a selection switch connected in series with said battery, a method comprising the steps of:

- detecting the electric current by a resistor connected in series with said selection switch to provide thereacross a detection signal changing the output level thereof in proportion to the electric current flowing therethrough;
- establishing a first reference signal having a predetermined level smaller than the output level of said detection signal proportional to the electric current flowing to said front and rear directional indicators and larger than the output level of said detection signal proportional to the electric current flowing to either one of said front and rear directional indicators;
- establishing a second reference signal having a predetermined level smaller than the output level of said detection signal proportional to the electric current flowing to either one of said front and rear directional indicators;
- comparing the output level of said detection signal with the predetermined level of said first reference signal to produce a first comparison output signal indicative of disconnection in either one of said front and rear directional indicators;
- comparing the output level of said detection signal with the predetermined level of said second reference signal to produce a second comparison output signal indicative of energization of at least one of said front and rear directional indicators;
- generating a train of periodic pulses in response to said second comparison output signal;
- changing the frequency of said periodic pulses in response to said first comparison output signal; and
- cutting off energization of said front and rear directional indicators periodically in response to said periodic pulses by a switching element which is connected in series with said selection switch and normally-conductive type in construction.

5. In a turn direction indicating system of a vehicle in which at least front and rear directional indicators connected in parallel with each other are energized to flash by an electric current flowing from a battery during closure of a selection switch connected in series with said battery, a method comprising the steps of:

- detecting the electric current by a resistor connected in series with said selection switch to provide thereacross a detection signal changing the output level thereof in proportion to the electric current flowing therethrough;
- establishing a reference signal having a predetermined level intermediate between two output levels of said detection signal, one of said two output levels being proportional to the electric current flowing to said front and rear directional indicators and the other of said two output levels being proportional to the electric current flowing to either one of said front and rear directional indicators;
- comparing the output level of said detection signal with the predetermined level of said reference signal to produce a comparison output signal;
- starting to charge and discharge a capacitor in response to said comparison output signal;
- comparing an output signal produced across said capacitor with another reference signal to produce pulse signals;
- controlling charge and discharge of said capacitor alternately in response to said pulse signals so that the output signal produced across said capacitor changes periodically;
- changing the frequency of said pulse signals in response to said comparison output signal; and
- cutting off energization of said front and rear directional indicators periodically in response to said pulse signals by a switching element which is connected in series with said selection switch and normally-conductive type in construction.

* * * * *